United States Patent
Sirbu

(10) Patent No.: US 7,257,130 B2
(45) Date of Patent: Aug. 14, 2007

(54) ASYMMETRIC COMPANION CODECS

(75) Inventor: Mihai Sirbu, Germantown, MD (US)

(73) Assignee: Texas Instruments Incorporated, Dallas, TX (US)

( * ) Notice: Subject to any disclaimer, the term of this patent is extended or adjusted under 35 U.S.C. 154(b) by 1022 days.

(21) Appl. No.: 10/608,500

(22) Filed: Jun. 30, 2003

(65) Prior Publication Data

US 2004/0264470 A1 Dec. 30, 2004

(51) Int. Cl.
*H04J 3/16* (2006.01)
*H04J 3/22* (2006.01)

(52) U.S. Cl. .................................. 370/465; 370/352

(58) Field of Classification Search ........ 370/351–356, 370/464, 465, 474, 401
See application file for complete search history.

(56) References Cited

U.S. PATENT DOCUMENTS

| 2003/0076815 A1* | 4/2003 | Miller et al. ............. 370/352 |
| 2004/0158463 A1* | 8/2004 | Jabri et al. ............... 704/219 |
| 2007/0030843 A1* | 2/2007 | Miller et al. ............. 370/352 |

* cited by examiner

*Primary Examiner*—Ajit Patel
(74) *Attorney, Agent, or Firm*—Steven A. Shaw; W. James Brady; Frederick J. Telecky, Jr.

(57) ABSTRACT

A system and method for using asymmetric companion codecs to establish and maintain a communication. A communication system endpoint replaces instances of a companion codec with the members of a group of all of the companion codecs for the endpoint and performs appropriate translations of compatible codecs to provide a communication between communication system endpoints.

16 Claims, 2 Drawing Sheets

ASYMMETRIC COMPANION CODECS

CROSS-REFERENCE TO RELATED APPLICATIONS

Not applicable.

FIELD OF THE INVENTION

The present invention relates generally to using asymmetric companion codecs to establish and maintain a communication.

BACKGROUND OF THE INVENTION

Standards are prevalent in telephony and data communications industries. Specifying and clarifying design principles, communication processes, test procedures, and environmental conditions have helped to assure product quality and multi-vendor interoperability. The voice over Internet Protocol (IP) community has a collection of standards for voice codecs derived out of multiple standards bodies such as the ITU (International Telecommunications Union) and the IETF (Internet Engineering Task Force). Vocoders are another area of continued standards evolution for voice over IP. Most vocoders used as part of VoIP solutions were based on existing standards created for digital telephony applications.

Wireline voice-over-packet gateways are used to convert digital voice signals into packets. Digital pulse code modulation (PCM) voice signals taken from SONET facilities are processed by the gateway. Voice channels are converted from their TDM format to digital "channels" and processed to remove any echo. The signal level is adjusted to appropriate levels and compression algorithms are applied to the channels. Following this, each channel is packetized and transmitted to the packet network. Various other optional processes may be needed to perform such functions as the extraction of signaling information, management of tones or detection of voice activity for comfort noise generation.

Signaling protocols used in wireline networks can be categorized by specific market segments. Service providers predominantly use session initiation protocol (SIP) as the transport protocol of choice. In this application, SIP is often used to replace and/or convert SS7 signaling. Cable operators have favored multimedia gateway control protocol (MGCP) for edge to client signaling. On the enterprise side, the H.323 protocol suite has been deployed almost exclusively.

Codecs follow a similar division based on market segments. ILECs and other large carriers typically focus on G.711 (or traditional PCM) and G.726 (adaptive PCM) due to their existing circuit-switched environment, and because of the ability to perform tandem coding without signal quality degradation. With any of the other available codecs, network design must consider the effects of tandem coding and quality implications.

Enterprises often use G.729AB and G.723.1A due to their low-bandwidth requirements and association with PC networks using Microsoft NetMeeting. The tradeoff here is that the signal quality is less than in the previously discussed codecs, and the network must be designed to control the number of tandem coding incidences. Additionally, the processing power required for a single channel using these codecs is roughly twice that of a PCM channel.

G.729E and G.728 are the primary codecs used by cable operators. These codecs provide a middle-of-the-road approach, their quality being roughly equal to PCM/ADPCM, but with reduced bandwidth. The approach provides quality suitable for more demanding applications (such as providing music while callers hold), but it is also the most expensive. The processing power required for one channel is roughly 3.5 times that required for a single PCM channel.

Under various protocols, individual media codecs have identifiers, which may be a names or a numeric codes. When a call is attempted, media connections (e.g., voice, video, music) will not be established unless the sending and receiving codec have the same identifier. An exact match is not really necessary since a number of codecs are code-level compatible, i.e. they can successfully decode each other's media stream.

Each code-compatible codec group is called companion group, and any two members of the same companion group are called companion codecs. In a companion group, any codec can successfully decode the output of any other group member. For example, G.729 and G.729B form a companion group, and G.729A and G.729AB form another companion group. These examples are not exhaustive, nor are the companion groups limited to voice codecs only.

SUMMARY OF THE INVENTION

The present invention provides a mechanism by which communication can be established in some cases even when the codec identifier on each side do not directly match. A first aspect of a system of the present invention for establishing a communication using asymmetric companion codecs includes a first communication system endpoint that advertises a transmit and receive codec pair in which the system replaces said codec pair, which contains a companion element that is a primary codec, with an expansion using all elements of a companion codec group. The companion group is substituted in the place of said primary codec.

In a further aspect of the invention, the communication system endpoint communicates externally using a matched element of said companion codec group and internally translates said communication using said primary codec. In another aspect, the communication system endpoint externally reports the companion codec capability as a selected codec for said communication between said communication system endpoint and a second communication system endpoint. In yet another aspect, the communication system endpoint advertises a plurality of companion codec pairs capabilities, and the plurality is a non-null subset of the expansion of the codec pair, including the primary codec, joined by all of the codec pairs that do not include the companion codecs.

In a further aspect of the present invention, the communication system endpoint eliminates one or more of a duplicate codec pairs that is generated by said expansion.

An aspect of the present invention for a system for establishing a communication using asymmetric companion codecs includes a communication system endpoint that advertises a transmit codec group and receive codec group in which the system replaces a codec pair the transmit and receive codec groups with an expansion using all elements of the companion codec group of the primary codec. In a further aspect of the system of the present invention, the communication system endpoint communicates externally using a matched element of said companion codec group and internally translates said communication using said primary codec.

In another aspect, the communication system endpoint externally reports the companion codec capability as a selected codec for said communication between said communication system endpoint and a second communication system endpoint. In yet a further aspect, the communication system endpoint advertises a plurality of companion codec pairs capabilities, and the plurality is a non-null subset of the expansion of the codec pair, including the primary codec, joined by all of the codec pairs that do not include the companion codecs.

In another aspect, the communication system endpoint eliminates one or more of a duplicate codec pairs that is generated by said expansion.

In a method for establishing a communication using asymmetric companion codecs, an aspect of the present invention includes advertising, with a communication system endpoint, a transmit and receive codec pair, and replacing said codec pair, which contains a companion element that is a primary codec, with an expansion using all elements of a companion codec group, wherein the companion group is substituted in the place of said primary codec. Another aspect includes communicating externally, with said communication system endpoint, using a matched element of said companion codec group, and translating, internally to said communication system endpoint, said communication using said primary codec.

Yet another aspect of the present invention includes reporting externally, with said communication system endpoint, the companion codec capability as a selected codec for said communication between said communication system endpoint and a second communication system endpoint. A further aspect includes advertising, with said communication system endpoint, a plurality of companion codec pairs capabilities, wherein the plurality is a non-null subset of the expansion of the codec pair, including the primary codec, joined by all of the codec pairs that do not include the companion codecs.

Still another aspect includes eliminating one or more of a duplicate codec pairs that is generated by said expansion.

An aspect of a method of the present invention further includes advertising, with said communication system endpoint, a transmit codec group and receive codec group, and replacing a codec pair in the transmit and receive codec groups with an expansion using all elements of the companion codec group of the primary codec.

BRIEF DESCRIPTION OF THE DRAWINGS

For a better understanding of the nature of the present invention, reference is had to the following figures and detailed description, wherein like elements are accorded like reference numerals, and wherein.

DETAILED DESCRIPTION OF PREFERRED EMBODIMENTS

Figure 1:
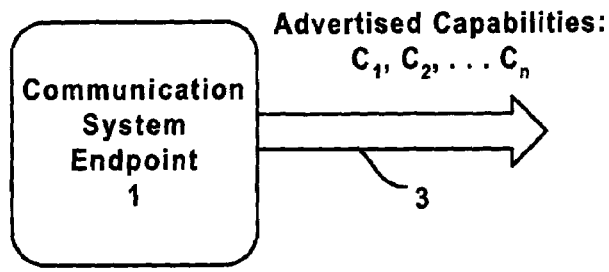
FIG. 1 shows the structure of an endpoint involved in two point or multipoint communication.

FIG. 1 illustrates a generic communication system endpoint 1 that is involved in two point or multipoint communication. An endpoint could be any system capable of sending and receiving a codec for a call setup or transmission. At some point during the protocol exchange with a remote endpoint(s) (not shown), the system endpoint 1 will advertise or transmit local capabilities 3, i.e. which codecs are available for communication with endpoint 1. For a non-exhaustive example, in an H.323 protocol exchange advertisement of codecs can be performed in the H.245 terminal capability set message, while under SIP (Session Initiation Protocol) codec advertisement occurs in the SDP (Session Description Protocol).

The list of codecs transmitted by endpoint 1 can have various structures. However, the list represents that, under some restrictions, the endpoint 1 is capable of using one or more of the advertised codecs to establish media communication.

A companion group is a code-compatible group of codecs wherein any two members of the same companion group are called companion codecs. In a companion group, any codec can successfully decode the output of any other group member. In an exemplary companion group CG', for the set of codecs $\{C'_1, C'_2, \ldots, C'_k\}$ with k>=2, any member of the companion group can correctly decode the output of any other member of the group. There is no theoretical upper limit on the number of the group members, but for practical reasons the number of codecs in a companion group is typically relatively small.

Figure 2:
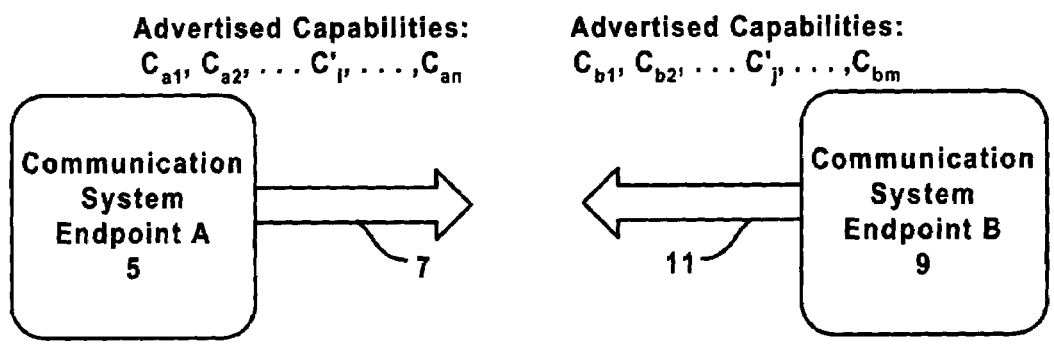
FIG. 2 is the diagram of a failed communication due to incompatible advertised capabilities.

FIG. 2 illustrates a communication system endpoint A (5) and a communication system endpoint B (9) that are attempting to establish a communication link. The figure shows a failure of a communication under normal circumstances without companion codec usage. Communication system endpoint A (5) advertises its capabilities 7, while communication system endpoint B (9) advertises its capabilities 11. System endpoint A (5) has n capabilities ($C_{a1}$, $C_{a2}, \ldots, C'_i, \ldots, C_{an}$) wherein n>=1, out of which $C'_i$ is part of companion group CG'. System endpoint B (9) advertises m capabilities 11 ($C_{b1}, C_{b2}, \ldots, C'_j, \ldots C_{bm}$) wherein m>=1, out of which $C'_j$ is also a part of the companion group CG'. No capability of advertised capabilities 7 from system endpoint A (5) matches a capability 11 of system endpoint B (9), including $C'_i$ or $C'_j$. The attempted call between system endpoint A (5) and system endpoint B (9) fails since no codec match can be found. However, system endpoint A could send $C'_i$ while system endpoint B could send $C'_j$. This would allow each system endpoint to decode the other system endpoint's communication, since both codecs $C'_i$ and $C'_j$ are part of the companion group CG'

Figure 3:
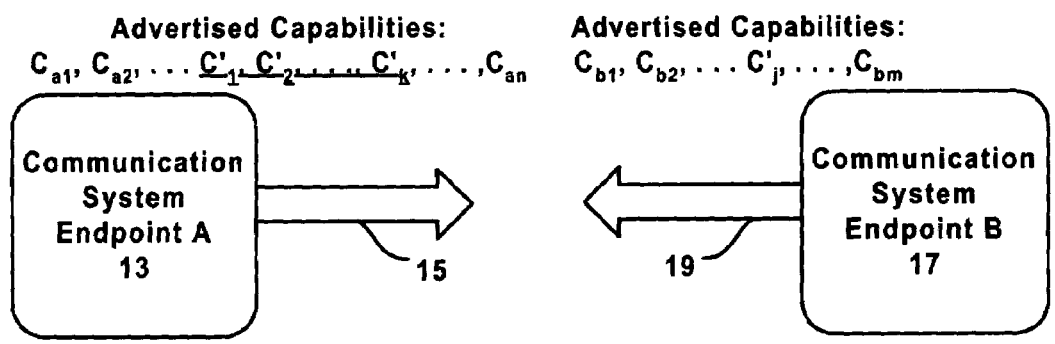
FIG. 3 is the diagram of a successful communication due to advertising and matching of companion codecs by at least one endpoint.

FIG. 3 illustrates a successful call between communication system endpoint A (13) and communication system endpoint B (17). The capabilities 19 advertised by system endpoint B (17) are identical to the capabilities communication system endpoint B (9) from FIG. 2. However, in this case, system endpoint A (13) has been configured with companion codecs. Communication system endpoint A's capabilities (15) include all the codecs of the companion group CG' instead of only $C'_i$. The system endpoint B (17) matches capabilities $C'_j$ (which is part of companion group CG') and uses $C'_j$ to send and receive media to and from system endpoint A (13). Capabilities 15 from system endpoint A match $C'_j$ as part of CG'. However, system endpoint A (13) is aware that its local codec, $C'_i$, is the reason for the inclusion of CG' in its capabilities. As such, system endpoint A (13) externally reports $C'_j$ as the selected codec but internally sends $C'_i$ since the incoming $C'_j$ codec is compatible with $C'_i$. The call succeeds without system endpoint B (17) being aware of the companion codec data. In the exemplary embodiment, the communication is successful due to the use of companion codecs, whereas without the companion codecs, the call would have failed.

Figure 4:
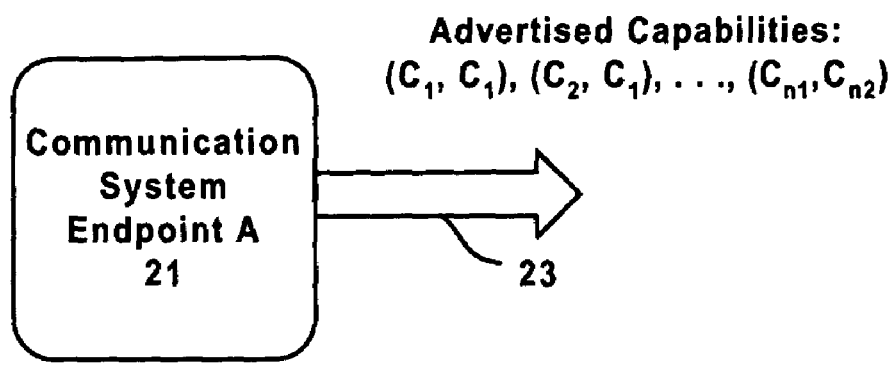
FIG. 4 is an illustration of advertising transmit and receive codec groups.

FIG. 4 illustrates an exemplary embodiment of a communication system endpoint 21 having codec capabilities that are advertised in transmit-receive specific pairs. A pair of the type $(C_x, C_x)$ is called a symmetric codec (i.e. the same codec is used to transmit and receive), while a pair $(C_x, C_y)$ where x is different from y is called an asymmetric codec. System endpoint 21 advertises capabilities 23 which include the transmit-receive specific pairs $(C_1,C_1), (C_2,C_1), \ldots (C_{n1}, C_{n2})$. In codec pairs, the first codec is typically the transmission codec and the second codec in the pair identifies the reception codec.

To use companion codecs with transmit-receive pairs, all pairs in which one of the two codecs is a member of a companion group are identified. For example, such a pair can be $(C_x, C'_i)$ or $(C'_i, C_x)$. Each pair will be replaced by a full set of all pairs generated by replacing the companion codec with each member of the companion group. In an exemplary embodiment, codec pair $(C_x, C'_i)$ is replaced by $(C_x, C'_1), (C_x, C'_2), \ldots, (C_x, C'_k)$, while $(C'_i, C_x)$ is replaced by $(C'_1, C_x), (C'_2, C_x), \ldots, (C'_k, C_x)$.

During communications between two or more communication system endpoints, codec pairs might be duplicated if the codec pairs are generated by expanding different original codec pairs. Depending on the structure of the advertised capability message, such duplicate pairs have to be maintained or eliminated. The capability matching of such a companion pair is then linked to one of the original codec pairs that has led to the expansion, and which codecs will be used to actually send and receive media. Further, there could be multiple original codec pairs.

Figure 5:
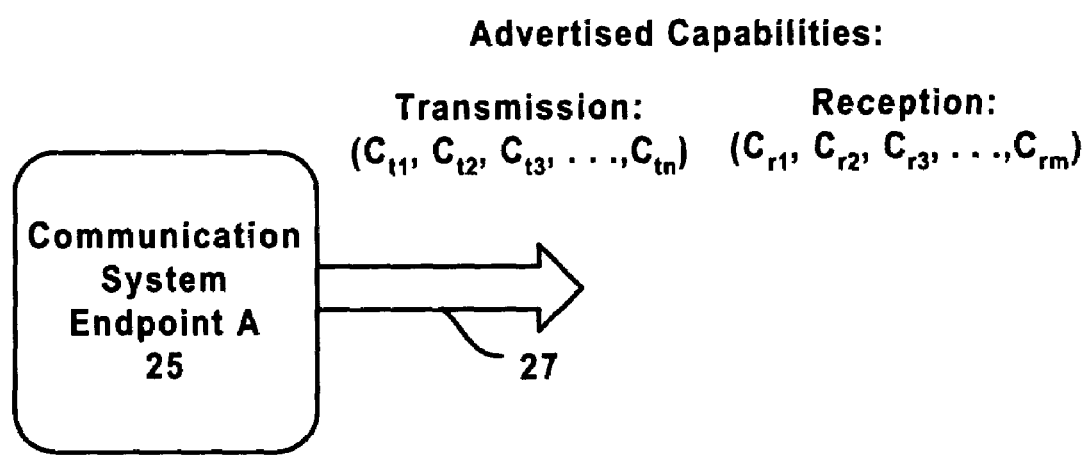
FIG. 5 is an illustration of advertising transmit and receive codec groups.

FIG. 5 illustrates an exemplary embodiment of a communication system endpoint 25 that advertises codec capabilities 27 in which transmit and receive groups are advertised separately. In this case, any combination of one transmit and one receive codec is a valid symmetric or asymmetric pair. In the original groups, any companion codec is expanded into its companion codec group, similar to the above description relating to FIG. 4. Once one transmit and one receive codec, however, is selected, the selected pair $(C_t,C_r)$ is processed similarly to the asymmetric codec shown in FIG. 5.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed:

1. A system for establishing a communication using asymmetric companion codecs, comprising:
    a communication system endpoint that advertises a transmit and receive codec pair in which the system replaces said codec pair, which contains a companion element that is a primary codec, with an expansion using all elements of a companion codec group,
    wherein said companion group is substituted in the place of said primary codec.

2. The system of claim 1, wherein said communication system endpoint communicates externally using a matched element of said companion codec group and internally translates said communication using said primary codec.

3. The system of claim 2, wherein said communication system endpoint externally reports the companion codec capability as a selected codec for said communication between said communication system endpoint and a second communication system endpoint.

4. The system of claim 1, wherein said communication system endpoint advertises a plurality of companion codec pairs capabilities, and
    wherein the plurality is a non-null subset of the expansion of the codec pair, including the primary codec, joined by all of the codec pairs that do not include the companion codecs.

5. The system of claim 1, wherein said communication system endpoint eliminates one or more of a duplicate codec pairs that is generated by said expansion.

6. A system for establishing a communication using asymmetric companion codecs, comprising:
    a communication system endpoint that advertises a transmit capabilities comprising one or more transmit codecs and receive capabilities comprising one or more receive codecs in which the system replaces a codec pair consisting of a primary codec selected from the transmit codecs and a primary codec selected from the receive codecs with an expansion using all elements of a respective companion codec group of the respective primary codec.

7. The system of claim 6, wherein said communication system endpoint communicates externally using a matched element of said companion codec group and internally translates said communication using said primary codec.

8. The system of claim 6, wherein said communication system endpoint externally reports the companion codec capability as a selected codec for said communication between said communication system endpoint and a second communication system endpoint.

9. The system of claim 6, wherein said communication system endpoint advertises a plurality of companion codec pairs capabilities, and
    wherein the plurality is a non-null subset of the expansion of the codec pair, including the primary codec, joined by all of the codec pairs that do not include the companion codecs.

10. The system of claim 9, wherein said communication system endpoint eliminates one or more of a duplicate codec pairs that is generated by said expansion.

11. A method for establishing a communication using asymmetric companion codecs, comprising:
    advertising, with a communication system endpoint, a transmit and receive codec pair; and
    replacing said codec pair, which contains a companion element that is a primary codec, with an expansion using all elements of a companion codec group,
    wherein said companion group is substituted in the place of said primary codec.

12. The method of claim 11, further comprising:
    communicating externally, with said communication system endpoint, using a matched element of said companion codec group; and
    translating, internally to said communication system endpoint, said communication using said primary codec.

13. The method of claim 12, further comprising:

reporting externally, with said communication system endpoint, the companion codec capability as a selected codec for said communication between said communication system endpoint and a second communication system endpoint.

14. The method of claim 11, further comprising:

advertising, with said communication system endpoint, a plurality of companion codec pairs capabilities, wherein the plurality is a non-null subset of the expansion of the codec pair, including the primary codec, joined by all of the codec pairs that do not include the companion codecs.

15. The method of claim 11, further comprising:

eliminating one or more of a duplicate codec pairs that is generated by said expansion.

16. The method of claim 11, further comprising:

advertising, with said communication system endpoint, a transmit codec group and receive codec group; and replacing a codec pair in the transmit and receive codec groups with an expansion using all elements of the companion codec group of the primary codec.

* * * * *